United States Patent
Kaji et al.

(10) Patent No.: US 9,499,702 B2
(45) Date of Patent: Nov. 22, 2016

(54) TRANSFER IMAGE RECORDING METHOD AND INK

(71) Applicant: CANON KABUSHIKI KAISHA, Tokyo (JP)

(72) Inventors: Mamiko Kaji, Kawasaki (JP); Takashi Imai, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 86 days.

(21) Appl. No.: 14/263,113

(22) Filed: Apr. 28, 2014

(65) Prior Publication Data
US 2014/0320573 A1    Oct. 30, 2014

(30) Foreign Application Priority Data
Apr. 30, 2013   (JP) .................................. 2013-095619

(51) Int. Cl.
| | | |
|---|---|---|
| *C09D 11/023* | (2014.01) | |
| *C09D 11/033* | (2014.01) | |
| *C09D 11/322* | (2014.01) | |
| *C09D 11/32* | (2014.01) | |
| *C09D 11/30* | (2014.01) | |
| *B41J 2/21* | (2006.01) | |
| *B41J 2/005* | (2006.01) | |
| *B41J 2/01* | (2006.01) | |
| *C09D 11/38* | (2014.01) | |
| *C09D 11/54* | (2014.01) | |

(52) U.S. Cl.
CPC ............ *C09D 11/033* (2013.01); *B41J 2/0057* (2013.01); *B41J 2/01* (2013.01); *B41J 2/211* (2013.01); *C09D 11/023* (2013.01); *C09D 11/30* (2013.01); *C09D 11/32* (2013.01); *C09D 11/322* (2013.01); *C09D 11/38* (2013.01); *C09D 11/54* (2013.01); *B41J 2002/012* (2013.01)

(58) Field of Classification Search
CPC . C09D 11/38; B41J 2/0057; B41J 2002/012; C08L 83/04
See application file for complete search history.

(56) References Cited

U.S. PATENT DOCUMENTS

| | | | | |
|---|---|---|---|---|
| 2002/0157569 A1* | 10/2002 | Takemoto | ............... | C09D 11/32 106/31.86 |
| 2002/0174800 A1* | 11/2002 | Moreland | ............... | C09D 11/38 106/31.02 |
| 2006/0204768 A1* | 9/2006 | King | ...................... | B41J 2/0057 428/447 |
| 2010/0092675 A1* | 4/2010 | Aoki | .................... | B41M 5/0011 427/256 |

FOREIGN PATENT DOCUMENTS

| | | |
|---|---|---|
| JP | 6-200200 A | 7/1994 |
| JP | 6-219039 A | 8/1994 |
| JP | 7-256873 A | 10/1995 |

* cited by examiner

*Primary Examiner* — Kristal Feggins
*Assistant Examiner* — Kendrick Liu
(74) *Attorney, Agent, or Firm* — Canon U.S.A. Inc., IP Division (57) ABSTRACT

In transfer image recording with the use of an intermediate transfer body whose surface on the side where an intermediate image is to be formed has a polyalkylsiloxane structure, an ink is used that contains at least a pigment, water, a water-soluble organic solvent, and a polyether-modified siloxane compound. Good and poor solvents for the polyether-modified siloxane compound are contained as the water-soluble organic solvent. The content of the polyether-modified siloxane compound in the ink is 3% by mass or more and 20% by mass or less based on the total mass of the ink.

6 Claims, 1 Drawing Sheet

TRANSFER IMAGE RECORDING METHOD AND INK

BACKGROUND OF THE INVENTION

1. Field of the Invention

The present invention relates to a transfer image recording method and an ink used therein.

2. Description of the Related Art

One of known recording methods in which ink jet or similar systems are used is transfer image recording. A transfer image recording method includes applying ink to an intermediate transfer body to form an intermediate image (intermediate-image formation) and pressing the intermediate transfer body against a recording medium to transfer the intermediate image to the recording medium (image transfer).

In such an image recording method, the intermediate transfer body is preferably made of a material that has a low surface energy and from which an intermediate image can be easily released because it is desirable that the intermediate image formed on the intermediate transfer body be efficiently transferred from the intermediate transfer body to the recording medium.

In general, however, applying ink droplets with a high water content to an intermediate transfer body made of a low-surface-energy material may fail to form the intended intermediate image because the droplets may be repelled on the intermediate transfer body. As a solution to this, Japanese Patent Laid-Open No. 6-200200 discloses a method in which such repelling of ink on an intermediate transfer body made of a low-surface-energy material is prevented, and this method includes adding a combination of two selected surfactants to ink. Japanese Patent Laid-Open No. 7-256873 discloses a method in which a transfer medium is coated with a surfactant first and then ink is applied so that repelling of ink on an intermediate transfer body should be prevented. Japanese Patent Laid-Open No. 6-219039 discloses an ink for transfer ink jet recording that contains an oil-in-water emulsion and a surfactant. The oil-in-water emulsion is for the purpose of forming a release layer for the intermediate image, and the surfactant is for stabilizing the emulsion in the ink and preventing the ink from being repelled or flowing.

SUMMARY OF THE INVENTION

An image recording method according to an aspect of the invention includes:

applying ink to an intermediate transfer body to form an intermediate image (intermediate-image formation); and transferring the intermediate image to a recording medium (image transfer).

The intermediate transfer body has a polyalkylsiloxane structure on the surface where the intermediate image is to be formed.

The ink contains a pigment, water, a water-soluble organic solvent, and a polyether-modified siloxane compound.

The water-soluble organic solvent contains a good solvent for the polyether-modified siloxane compound and a poor solvent for the polyether-modified siloxane compound.

The content of the polyether-modified siloxane compound in the ink is 3% by mass or more and 20% by mass or less based on the total mass of the ink.

An ink according to an aspect of the invention is used in an image recording method that includes:

applying the ink to an intermediate transfer body to form an intermediate image, the intermediate transfer body having a polyalkylsiloxane structure on the surface on which the intermediate image is formed (intermediate-image formation); and transferring the intermediate image to a recording medium (image transfer).

The ink contains a pigment, water, a water-soluble organic solvent, and a polyether-modified siloxane compound.

The water-soluble organic solvent contains a good solvent for the polyether-modified siloxane compound and a poor solvent for the polyether-modified siloxane compound.

The content of the polyether-modified siloxane compound in the ink is 3% by mass or more and 20% by mass or less based on the total mass of the ink.

Further features of the present invention will become apparent from the following description of exemplary embodiments with reference to the attached drawing.

DESCRIPTION OF THE EMBODIMENTS

Figure 1:
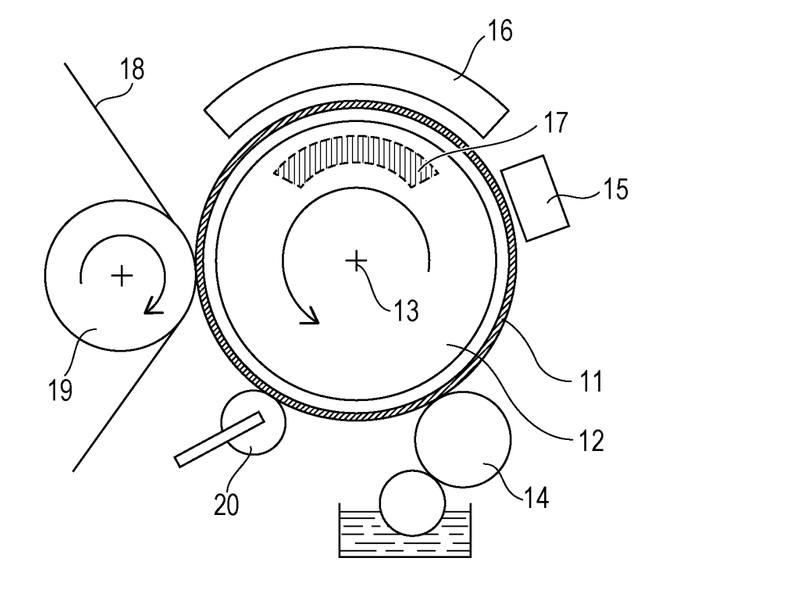
The FIGURE is a schematic view of a recording apparatus that can be used in a transfer image recording method according to an aspect of the invention.

As stated above, in a transfer image recording method in which an intermediate transfer body made of a low-surface-energy material is used, it is required to prevent problems associated with ink droplets on the intermediate transfer body, such as unwanted repelling and flow. Such problems are prevented by the addition of a surfactant to the ink in Japanese Patent Laid-Open Nos. 6-200200 and 6-219039 and by coating the intermediate transfer body with a surfactant in advance of the formation of the intermediate image in Japanese Patent Laid-Open No. 7-256873. In order for the recorded image to be of high quality, however, it is needed not only to prevent the aforementioned repelling and flow of ink droplets but also to ensure that the spread and the shape of the ink dots at the formation of the intermediate image are such that the high quality can be achieved. From the viewpoint of efficient use of ink, furthermore, it is necessary to satisfy the above performance requirement with as little ink as possible.

As for the material used to make the intermediate transfer body, polyalkylsiloxanes, which are low-surface-energy materials, are particularly preferred for easier release of the intermediate image.

However, the inventors found through research that recording an image using a polyalkylsiloxane-based intermediate transfer body in the transfer image recording methods described in the above publications failed in some cases to provide a good-quality intermediate image in a consistent manner. This was presumably because insufficient spread of ink-dot diameter or distorted shapes of ink dots on the intermediate transfer body made the intermediate image vary in quality. The above publications do not disclose any means for solving such a technical problem.

More specifically, Japanese Patent Laid-Open No. 6-200200 focuses on image deformation due to repelling and flow of ink droplets on an intermediate transfer body, but does not mention how to control the spread of the dot diameter and the dot shape of the ink. Adding a surfactant to prevent ink droplets from being repelled or flowing as in Japanese Patent Laid-Open No. 6-200200 leads to insufficient spread of dot diameter and probably needs additional measures such as increasing the volume of ink applied. This means that the method disclosed in Japanese Patent Laid-Open No. 6-200200 may fail to fulfill the purpose of reducing the volume of ink applied.

Applying a surfactant to an intermediate transfer body as in Japanese Patent Laid-Open No. 7-256873 causes the surfactant to be repelled on the transfer medium and scattered and thus can fail to apply the surfactant evenly on the transfer medium. Trying to produce a single dot or a fine image in such a situation can make the resulting image vary in quality because some amount of the ink does not make contact with the surfactant on the transfer medium and this causes reduced dot size or distortion.

An example in Japanese Patent Laid-Open No. 6-219039 describes an ink for transfer ink jet recording that contains a silicone surfactant. This publication, however, does not mention how the spread and the shape of ink dots can be controlled when this ink is used. Furthermore, applying the silicone-surfactant-containing ink disclosed in this publication to a polyalkylsiloxane-based intermediate transfer body results in insufficient spread of ink-dot diameter during the formation of the intermediate image, necessitating increasing the volume of ink applied.

An aspect of the invention therefore provides a transfer image recording method by which a high-quality image, i.e., an image with sufficient spread of ink-dot diameter and a uniform dot shape, can be obtained even with a small volume of ink applied. Another aspect of the invention provides an ink used in this method.

An ink composition (hereinafter simply referred to as "ink") according to an embodiment of the invention is an ink for image recording with an intermediate transfer body whose surface on the side where an intermediate image is to be formed is a release surface that has a surface polyalkylsiloxane structure. The ink contains a pigment, water, a water-soluble organic solvent, and a polyether-modified siloxane compound. As the water-soluble organic solvent, at least one water-soluble organic solvent as a good solvent for the polyether-modified siloxane compound and at least one water-soluble organic solvent as a poor solvent are contained. The content of the polyether-modified siloxane compound is selected to be 3% by mass or more and 20% by mass or less.

Forming an intermediate image on the release surface of the intermediate transfer body, the release surface having a surface polyalkylsiloxane structure, by using an ink according to an embodiment of the invention that has the above composition prevents ink droplets from being repelled or flowing and also leads to good spread and a good shape of ink dots. An aspect of the invention therefore brings the above advantages without needing any means that ensures good spread of ink dots by increasing the volume of ink applied to the intermediate transfer body.

The inventors presume that the reason why an ink according to an aspect of the invention has the above advantages can be as follows.

A polyether-modified siloxane compound is a surface active substance that has a hydrophilic polyether chain and a hydrophobic siloxane structure. Adding some amount of a polyether-modified siloxane compound, an amount larger than a certain threshold, to an ink with a high water content causes the polyether-modified siloxane compound to form a micelle structure in water with the hydrophilic chain facing outward. Adding both a water-soluble organic solvent that is a good solvent for the polyether-modified siloxane compound and a water-soluble organic solvent that is a poor solvent to such a micelle structure probably leads to each solvent working as follows.

The poor solvent, which has a low affinity with the polyether-modified siloxane compound existing in water, acts to destabilize the micelle structure of the polyether-modified siloxane compound, although hydrogen bonds have stabilized the micelle structure. Applying an ink that contains a polyether-modified siloxane compound in such an unstable state to silicone rubber, which is a low-surface-energy material, causes the polyether-modified siloxane compound to be selectively oriented to the surface of the silicone rubber to be in a more stable state. The poor solvent therefore presumably works in such a way that ink droplets become more easily wet the silicone rubber. As a result, presumably, unwanted repelling and flow of the ink on the silicone rubber are prevented.

The good solvent presumably works in such a way that the good solvent be adsorbed onto the hydrophilic chain of the polyether-modified siloxane compound oriented to the surface of the low-surface-energy silicone rubber and form a stable solid-liquid interface.

If the content of the good solvent in the ink is too large, the increase in ink-dot diameter may be insufficient because the micelles formed by the polyether-modified siloxane compound are stable and the rate of adsorption of the polyether-modified siloxane compound onto the silicone rubber is slow. If the content of the poor solvent in the ink is too large, however, then it also leads to insufficient increase in ink-dot diameter because the polyether-modified siloxane compound oriented to the surface of the silicone rubber cannot be easily adsorbed and fixed in a stable manner. Ensuring that the ratio between the good solvent and the poor solvent is in the particular range specified below therefore allows the diameter of ink dots on the silicone rubber to sufficiently increase even with a small volume of ink applied.

The following describes the individual components of an ink according to an embodiment of the invention.

The poor solvent and the good solvent used herein are first described. A water-soluble organic solvent is defined as a good solvent if the dispersion stability of the polyether-modified siloxane compound in the solvent is good, and as a poor solvent if this dispersion stability is poor. Further details are provided in a later section.

In certain aspects of the invention, focus is placed on water-soluble organic solvents contained in an aqueous ink. What characterizes certain aspects of the invention is that water-soluble organic solvents are grouped into poor solvents and good solvents according to the solubility of the polyether-modified siloxane compound and that the composition of the ink is designed with the ratio between a poor solvent and a good solvent in the aqueous ink adjusted to fall within a particular range. The use of such a configuration brings a significant advantage: A high-quality printed material can be obtained even with a small volume of ink applied with respect to the surface of an intermediate transfer body on which an intermediate image is formed. Certain aspects of the invention were completed with the discovery of these novel configuration and advantages of an ink for transfer image recording.

Ink for Transfer Image Recording
Polyether-Modified Siloxane Compound

An ink according to an embodiment of the invention, which has an excellent affinity with polyalkylsiloxanes, contains a polyether-modified siloxane compound, which has a siloxane structure in the molecular structure like polyalkylsiloxanes and also has a polyether chain for providing hydrophilicity. When droplets of the ink are applied to the surface of an intermediate transfer body on which an intermediate image is to be formed (hereinafter referred to as "the intermediate image formation surface"), ink dots are formed, and the aforementioned orientation of the polyether-modified siloxane compound sequentially occurs in the direction of the spread of the ink dots on the intermediate image formation surface. In the edge portion of the ink dots, the polyether-modified siloxane compound is sequentially supplied out of the ink to the intermediate image formation surface. This makes the ink dots more easily expand in diameter and ensures good spread and a good shape of the ink dots.

If the content of the polyether-modified siloxane compound is too small, then the amount of the polyether-modified siloxane compound that forms a micelle structure in the aqueous ink is small. As a result, the amount of the polyether-modified siloxane compound that is oriented toward the surface of the intermediate transfer body is substantially small. The spread of ink-dot diameter will be insufficient once the supply to the edge portion of the expanding ink dots is inadequate. If the content of the polyether-modified siloxane compound is too large, it may be difficult to discharge the ink from an ink jet apparatus. It is thus preferred that the content of the polyether-modified siloxane compound be 3% by mass or more and 20% by mass or less based on the total mass of the ink. More preferably, the content of the polyether-modified siloxane compound is 9% by mass or more and 20% by mass or less based on the total mass of the ink in order that particularly good spread in ink-dot diameter and a particularly good shape of ink dots can be obtained.

Depending on the composition of the ink, increasing the quantity of the ink that makes up the ink droplets applied to the intermediate transfer body may lead to sufficient spread of ink dots. In certain aspects of the invention, adding both a poor solvent and a good solvent for the polyether-modified siloxane compound in combination to the ink, rather than increasing the quantity of the ink that makes up such ink droplets to ensure sufficient spread of ink dots, brings the intended advantages. Certain aspects of the invention therefore allow the user to form a high-quality intermediate image even with a minimum amount of ink applied.

The polyether-modified siloxane compound can be, in particular, a siloxane compound that has a structure based on a polyether-containing hydrophilic siloxane unit and a hydrophobic siloxane unit. The presence of a hydrophilic unit and a hydrophobic unit provides the siloxane compound with surface activity. Examples of polyether-modified siloxane compounds that have such a structure include those having a polyether chain in a side chain (side-chain polyether-modified siloxane compounds), those having a polyether chain in the main chain (main-chain polyether-modified siloxane compounds), and structures that have both. In particular, side-chain polyether-modified siloxane compounds represented by general formula (1), having a polyether chain in a side chain, are extremely preferred:

(1)

(where $R^1$ to $R^4$ and $R^6$ to $R^{11}$ independently represent hydrogen or a monovalent organic group, $R^5$ represents a divalent organic group, x, y, and "a" independently represent an integer of at least 1, and z and b independently represent an integer of at least 0).

The unit $(C_2H_4O)$ in a side-chain polyether-modified siloxane compound of general formula (1) represents an ethylene oxide unit, and $(C_3H_6O)$ represents a propylene oxide unit. The ethylene oxide units and the propylene oxide units in a side-chain polyether-modified siloxane compound used in an embodiment of the invention can be present in any form, e.g., a random form or a block form. A random form of the units means that the ethylene oxide units and the propylene oxide units are arranged irregularly, whereas a block form of the units means that blocks each made up of a number of units of either kind are arranged regularly.

The groups $R^1$ to $R^4$ and $R^6$ to $R^{11}$ are preferably monovalent hydrocarbon groups, more preferably linear or branched alkyl groups that contain 1 or more and 10 or less carbon atoms, in particular, methyl groups. The group $R^5$ is preferably a linear or branched alkylene group that contains 1 or more and 10 or less carbon atoms, in particular, one of groups such as ethylene, propylene, and butylene. The group $R^6$ is preferably a linear or branched alkyl group that contains 1 or more and 10 or less carbon atoms, in particular, an ethyl group or a propyl group. The integer x is preferably 1 or more and 500 or less, more preferably 1 or more and 100 or less, in particular 1 or more and 10 or less. The integer y is preferably 1 or more and 100 or less, more preferably 1 or more and 50 or less. The integer z is preferably 0 or more and 500 or less, more preferably 0 or more and 100 or less, in particular 0 or more and 10 or less. The integer "a" is preferably 1 or more and 500 or less, more preferably 1 or more and 100 or less. The integer b is preferably 0 or more and 500 or less, more preferably 0 or more and 100 or less.

Such a compound represented by general formula (1) preferably has a weight-average molecular weight of 100,000 or less, more preferably 10,000 or less. A preferred lower limit for this weight-average molecular weight is 500. This weight-average molecular weight is a polystyrene-equivalent weight-average molecular weight in a molecular weight distribution measured by gel permeation chromatography. A compound of general formula (1) used in an embodiment of the invention is usually a mixture of multiple compounds with different molecular weights, and the molecular weight thereof is determined as an average molecular weight.

Specific examples of side-chain polyether-modified siloxane compounds of general formula (1) include BYK347, BYK348, BYK349, BYK331, and BYK307 (trade names, BYK Japan KK).

Such a side-chain polyether-modified siloxane compound, which has some degree of hydrophilicity because of the presence of a polyether chain in a side chain, does not have to be soluble in water because the state of dispersion of a polyether-modified siloxane compound in solvent greatly varies according to factors such as the kind of the solvents added and the solvent proportions. In particular, the use of a water-soluble organic solvent probably leads to a micelle state of the polyether-modified siloxane compound being formed in a mixture of water and the water-soluble organic solvent. The minimum requirement is therefore that the polyether-modified siloxane compound achieve a dispersion state in water without separating out or settling down.

Water and a Water-Soluble Organic Solvent

A liquid medium for an ink according to an embodiment of the invention is a mixture of water and a water-soluble organic solvent. This water-soluble organic solvent can be a known water-soluble organic solvent. Specific examples include, but are not limited to, glycerin, ethanol, methanol, 2-propanol, 2-pyrrolidone, hexylene glycol, diethylene glycol, 1,2-hexanediol, and 1,5-pentanediol. The content of the water-soluble organic solvent can be 10% by mass or more and 60% by mass or less based on the total mass of the ink.

As another water-soluble organic solvent, a mixture of at least one good solvent, in which the solubility of the polyether-modified siloxane compound is high, and at least one poor solvent, in which the solubility of the siloxane compound is low, is used.

In certain aspects of the invention, water-soluble organic solvents in which the solubility of the polyether-modified siloxane compound is low are defined as poor solvents, and water-soluble organic solvents in which the solubility of the polyether-modified siloxane compound is high are defined as good solvents. More specifically, the method described below can be used to determine whether a certain water-soluble organic solvent is a poor solvent or a good solvent.

Method for Determining Whether a Solvent is a Good Solvent or a Poor Solvent

A polyether-modified siloxane compound is added dropwise to the water-soluble organic solvent of interest in such a manner that the siloxane compound should constitute 25% by mass of the total mass. The liquid is tightly sealed and left at room temperature for 1 day. Then the state of the liquid is compared to that of the water-soluble organic solvent observed before the addition of the siloxane compound. If the liquid is turbid or contains an oily substance or a precipitate, the water-soluble organic solvent is a poor solvent. If no particular changes have occurred in the liquid, the water-soluble organic solvent is a good solvent. As for the criteria for a good solvent, judgment can be made by the measurement of turbidity with the use of a transmittance/haze meter.

The mass ratio between the good solvent and the poor solvent can be selected as appropriate according to factors such as the kind of the solvents and the polyether-modified siloxane compound as long as the intended advantages of certain aspects of the invention are ensured.

Preferably, the ratio between the poor solvent and the good solvent (poor solvent/good solvent) is 95/5 or more and 20/80 or less on a mass basis. It is therefore preferred that the content of the poor solvent be 0.25 times or more and 19 times or less of the content of the good solvent on a mass basis. Ensuring that the mass ratio is in this range effectively improves the wetting of the ink on the intermediate image formation surface of the intermediate transfer body, the intermediate image formation surface having a polyalkylsiloxane structure. If the proportion of the good solvent exceeds 80% by mass of the total content of the poor solvent and the good solvent, the micelle structure of the polyether-modified siloxane compound in the ink is more stable than in other cases, which can lead to reduced ability of the polyether-modified siloxane compound to be adsorbed onto the intermediate transfer body. If the proportion of the poor solvent exceeds 95% by mass of the total content of the poor solvent and the good solvent, the polyether-modified siloxane compound in the ink can separate out and form a precipitate. More preferably, the ratio between the poor solvent and the good solvent (poor solvent/good solvent) is 80/20 or more and 30/70 or less on a mass basis.

The content of the poor solvent relative to the total mass of the ink can be 0.2 times or more and 1.8 times or less of the content of the polyether-modified siloxane compound on a mass basis.

The water used in the ink can be deionized water. The proportion of water in the total mass of the ink can be selected to be 30% by mass or more and 95% by mass or less according to the content ratios of the components other than water, although not limited to this range.

Pigment

An ink according to an embodiment of the invention contains a pigment. Examples of pigments that can be used in an embodiment of the invention include all pigments, such as known black pigments and known organic pigments. More specifically, pigments represented by C.I. (color index) numbers can be used. A black pigment that can be used is carbon black. The content of the pigment in the ink is preferably 0.5% by mass or more and 15.0% by mass or less, more preferably 1.0% by mass or more and 10.0% by mass or less based on the total mass of the ink. One or a combination of two or more pigments can be used as necessary.

Dispersant

The ink may contain a dispersant that allows the pigment to be dispersed. All dispersants that are used to disperse pigments or similar materials in aqueous inks can be used. For example, one or a combination of two or more known dispersants for inks for ink jet can be used.

In an embodiment of the invention, water-soluble dispersants that have both a hydrophilic moiety and a hydrophobic moiety in the structure can be used. In particular, it is possible to use a pigment dispersant based on a polymer obtained by the copolymerization of monomers including at least a hydrophilic one and a hydrophobic one. The monomers used for this purpose can be of any kind and can be selected from known monomers for dispersants. Specific examples of hydrophobic monomers include styrene, styrene derivatives, alkyl (meth)acrylates, and benzyl (meth) acrylates, and one or a combination of two or more such monomers can be used. Examples of hydrophilic monomers include acrylic acid, methacrylic acid, and maleic acid, and one or a combination of two or more such monomers can be used.

The acid value of such a dispersant can be 50 mg KOH/g or more and 550 mg KOH/g or more. The weight-average molecular weight of such a dispersant can be 1000 or more and 50000 or less. The ratio between the pigment and such a dispersant (on a mass basis) can be 1:0.1 or more and 1:3 or less.

Self-dispersion pigments, i.e., pigments that are dispersible in the aqueous medium in the ink without dispersants as a result of surface modification, can also be used in an embodiment of the invention.

Polymer Particles

An ink according to an embodiment of the invention may contain various particles in addition to the pigment. Such particles are not involved in the coloring of the ink and can be added to the ink in order that the appearance and fixation of images can be improved. Such particles can be made of any material. In particular, polymer particles improve the image quality and the fixation of image more effectively than other kinds of particles.

Examples of materials for polymer particles that can be used in an embodiment of the invention include appropriate known polymers. Specific examples include homopolymers such as polyolefins, polystyrene, polyurethane, polyester, polyethers, polyurea, polyamides, polyvinyl alcohol, poly (meth)acrylic acid and poly(meth)acrylic acid salts, polyalkyl (meth)acrylates, and polydienes and copolymers that are combinations of two or more such homopolymers. The mass-average molecular weight of a polymer contained in such polymer particles can be 1,000 or more and 2,000,000 or less. The content of such polymer particles in the ink is preferably 1% by mass or more and 50% by mass or less, more preferably 2% by mass or more and 40% by mass or less.

In an embodiment of the invention, such polymer particles can be used in the form of polymer-particle dispersion, i.e., polymer particles dispersed in a liquid. Such a dispersion can be prepared by any dispersion technique. For example, what are called self-dispersion polymer-particle dispersions, i.e., dispersions prepared by dispersing a polymer obtained by the polymerization of a monomer that has a dissociative group or the copolymerization of two or more such monomers, can be used. Examples of dissociative groups include carboxyl, sulfonic acid, and phosphoric acid groups. Examples of monomers that have a dissociative group include acrylic acid and methacrylic acid, and one or a combination of two or more such monomers can be used. What are called emulsification-dispersion polymer-particle dispersions, i.e., polymer particles dispersed with the use of an emulsifier, can also be used in an embodiment of the invention. Examples of emulsifiers that can be used for this purpose include known low-molecular-weight and high-molecular-weight surfactants. Such a surfactant can be a nonionic one or a surfactant that has the same electric charge as the polymer particles.

A polymer-particle dispersant that can be used in an embodiment of the invention desirably has a particle diameter of 10 nm or more and 1000 nm or less. It is more desirable that this particle diameter be 30 nm or more and 500 nm or less.

It is also possible to prepare such a polymer-particle dispersant with additives for stabilization purposes. Examples of additives that can be used include n-hexadecane, dodecyl methacrylate, stearyl methacrylate, chlorobenzene, dodecyl mercaptan, olive oil, blue dyes (Blue 70), and polymethyl methacrylate. One or a combination of two or more such additives can be used.

Intermediate Transfer Body

The intermediate transfer body has an intermediate image formation surface, on which an intermediate image can be formed and from which the intermediate image can be transferred to a recording medium. This intermediate image formation surface has a polyalkylsiloxane structure that allows the intermediate image to be released. The intermediate transfer body has a mechanical strength such that the amount of force required during the use thereof can be transmitted. The intermediate transfer body may be totally made of the same material or may have a supporting member that provides such a mechanical strength and a surface member that has the intermediate image formation surface.

Examples of the shape of the intermediate transfer body include a sheet shape, a roller shape, a drum shape, a belt shape, and an endless-web shape.

The use of an endless-web-structured intermediate transfer body, such as a drum-shaped or belt-shaped one, allows for the continuous and repeated use of a single intermediate transfer body and is highly advantageous in respect of productivity. The size of the intermediate transfer body can be selected as appropriate for the intended size of the image to be printed.

When the intermediate transfer body has a supporting member, the supporting member should have a structural strength deemed necessary from the viewpoints of the conveyance accuracy and the durability of the intermediate transfer body. If a material that has a surface polyalkylsiloxane structure satisfies such a structural strength requirement, the internal transfer body can be totally made of this material having a surface polyalkylsiloxane structure.

It is also possible to use an intermediate transfer body that has a supporting member made of a material that has such a structural strength and a surface section made of a material that has a surface polyalkylsiloxane structure, with the surface section on the supporting member. Examples of materials for a supporting member used for such purposes include metals, ceramics, and polymers. A composite material that contains two or more such materials can also be used as a material for such a supporting member. In particular, the following materials can be used because of the rigidity that allows the intermediate transfer body to withstand the pressure applied during the transfer of the intermediate image, dimensional accuracy, and characteristics needed for reduced operational inertia and improved responsiveness to control: aluminum, iron, stainless steel, acetal polymers, epoxy polymers, polyimides, polyethylene, polyethylene terephthalate, nylon, polyurethane, silica ceramics, and alumina ceramics. Combinations of these materials can also be used.

The intermediate image formation surface of the intermediate transfer body can have some degree of elasticity so that the intermediate image can be transferred to the recording medium, such as paper, by pressing. For example, when the recording medium is paper, the hardness of a surface section that provides the intermediate image formation surface is preferably in the range of 10° to 100°, more preferably 20° to 60°, as measured with the use of a type-A durometer (JIS K6253-compliant).

A compound that contains a polyalkylsiloxane structure can be used as a material for the intermediate image formation surface. The polyalkylsiloxane structure refers to a siloxane skeleton that contains an alkyl group in the structure. The alkyl group can be a group selected from organic groups that have 1 to 20 carbon atoms, in particular. To be used as a material for the intermediate image formation surface, the aforementioned compound may have release properties. Hence the polyalkylsiloxane structure can be a structure that has at least one of methyl, ethyl, propyl, and butyl groups. A compound can be chosen that has hardness and elastic modulus parameters that match the number of times the intermediate transfer body will be used repeatedly and the pressure applied to the transfer body during image transfer.

In particular, silicone rubber, fluorosilicone rubber, phenyl silicone rubber, and siloxane compounds such as condensation products of hydrolyzable organosilicon compounds are suitable for use as such a polyalkylsiloxane-structure-containing compound in respect of the release of the intermediate image for transfer to the recording medium and the durability of the intermediate image formation surface alone. It is possible to use a combination of two or more such materials as necessary.

When the intermediate transfer body has a surface section that provides the intermediate image formation surface, the surface section may have an outermost layer that provides the surface having a polyalkylsiloxane structure and at least one layer made of a different material beneath the outermost layer. For example, a multilayer material composed of a polyurethane belt and a thin coating of silicone rubber can be used.

Furthermore, an adhesive material or double-sided tape may be disposed between a surface section and a supporting member so that these components should remain fixed to each other.

Reaction Solution

It is also possible to apply a reaction solution capable of undergoing aggregation reaction with the ink to the intermediate image formation surface of the intermediate transfer body beforehand in order to increase the viscosity of the ink to be applied to the intermediate transfer body and to stabilize the intermediate image and make the intermediate image easier to transfer.

Such a reaction solution contains an ink viscosity increasing component. An increased viscosity of the ink means that contact between the ink and the ink viscosity increasing component has noticeably increased the viscosity of the entire ink as well as a local increase in viscosity due to aggregation of a portion of the ink composition, e.g., the pigment used as a coloring material. Adding a viscosity increasing component to the ink reduces the fluidity of the ink on the intermediate transfer body, thereby reducing bleeding, i.e., mixing of ink dots applied adjacent to each other, and beading, i.e., attraction of ink dots that reach the substrate first to ink dots that follow. Such an ink viscosity increasing component can be of any kind, such as a metal ion or a polymer coagulant, preferably a substance that makes the ink aggregate by causing a change in the pH of the ink, more preferably an organic acid.

Examples of organic acids include oxalic acid, polyacrylic acid, formic acid, acetic acid, propionic acid, glycolic acid, malonic acid, malic acid, maleic acid, ascorbic acid, levulinic acid, succinic acid, glutaric acid, glutamic acid, fumaric acid, citric acid, tartaric acid, lactic acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, oxysuccinic acid, and dioxysuccinic acid. One or a combination of two or more such organic acids can be used.

Such a reaction solution can also contain polymers for easier image transfer and improved fastness of the finished image. Adding a polymer will lead to good adherence of the transferred intermediate image to the recording medium and enhanced mechanical strength of ink coatings. Some polymers may additionally improve the water resistance of the image. All polymeric materials can be used that can coexist with the ink viscosity increasing component in the reaction solution and have the aforementioned intended functions. It is also possible to use a polymer that forms cross-links with a component contained in the ink through reaction with that component. Such polymers may be dissolved in the solvent of the reaction solution or added in the form of an emulsion or a suspension.

Furthermore, it is possible to add a surfactant to such a reaction solution to adjust the surface tension of the solution as appropriate before use.

Application of the Reaction Solution

When such a reaction solution is used, the reaction solution can be applied to the surface of the intermediate transfer body by appropriate known techniques. Examples include die coating, blade coating, techniques in which gravure rollers are used, techniques in which offset rollers are used, and spray coating. Ink jet apparatuses can also be used to apply the reaction solution. It is also possible to combine two or more different techniques.

Then to the surface of the intermediate transfer body, to which the reaction solution has been applied, the ink is applied with the use of an ink jet apparatus to form an image. For the sake of convenience, the image formed on the intermediate transfer body is referred to as an "intermediate image" until transfer to the final recording medium.

Image Formation

Examples of the mode of ink ejection of ink jet apparatuses that can be used in an embodiment of the invention include the following:

An electrothermal transducer is used to induce film boiling in the ink, and the resulting air bubbles are used to eject the ink;

An electromechanical transducer is used to eject the ink; and

Static electricity is used to eject the ink.

The ink jet apparatus used to form the intermediate image may have any structure that allows an ink according to an embodiment of the invention to form the intermediate image. In particular, the use of an apparatus that ejects ink with the use of an electromechanical transducer allows a high-density image to be formed at a high speed.

Furthermore, the mode of operation of the ink discharge head of the ink jet apparatus is not limited. The ink discharge head can be an ink jet head that is called a shuttle head, which forms the intermediate image while moving the head in the direction perpendicular to the direction of the travel of the intermediate transfer body, and can also be an ink jet head that is called a line head, which has ink ejection openings arranged in a line roughly perpendicular to the direction of the travel of the intermediate transfer body (i.e., roughly parallel to the axial direction for a drum-shaped intermediate transfer body).

Moisture Removal

The intermediate image on the intermediate transfer body may be subjected to a treatment for reducing the liquid content. Excessive liquid in the intermediate image can cause problems with the appearance of the finished image or incomplete transfer of the image as a result of the surplus liquid being squeezed or spilled out during image transfer. Various techniques can be used to do this moisture removal. Example of techniques that can be used include those in which the intermediate image is heated, those in which low-humidity air is blown, those in which the intermediate image is placed under reduced pressure, those in which the intermediate image comes into contact with an absorbent, and combinations of such techniques. It is also possible to remove moisture from the intermediate image by air-drying the image from the completion of the formation of the intermediate image to the transfer of the image to the recording medium.

Image Transfer

The pressing of the intermediate transfer body against the recording medium can be done by any method. Pressing the intermediate transfer body and the recording medium from both sides with a pressure roller allows the image to be efficiently transferred. Pressing these components in multiple steps can be effective in reducing the degree of incomplete transfer.

Cleaning

Although no further operations are needed to finish recording the image, the intermediate transfer body may be used repeatedly and continuously from the viewpoint of productivity, and in such cases it is possible to clean and regenerate the surface of the intermediate transfer body before the next time when an image is recorded. Various techniques can be used to carry out this cleaning and regeneration. Examples of techniques that can be used include those in which a shower of cleaning liquid is applied, those in which the intermediate transfer body is wiped with a wet molleton-covered roller abutted on the surface thereof, those in which the intermediate transfer body comes into contact with the surface of a cleaning liquid, those in which the intermediate transfer body is scraped with a wiper blade, and those in which kinds of energy are applied. Naturally, combinations of two or more such techniques can also be used.

Fixation

In addition to the foregoing, the recorded article that has the transferred intermediate image may be pressed with a roller so that the image can be more firmly fixed to the recording medium in the recorded article. Heating the recorded article may also improve the fixation of the image. Naturally, it is also possible to carry out these treatments simultaneously by using a heating roller.

Transfer Ink Jet Recording Apparatus

The FIGURE illustrates an example of an apparatus that can be used in a transfer image recording method according to an embodiment of the invention. The FIGURE is a schematic diagram in which the structure of a transfer ink jet recording apparatus that has a drum-shaped intermediate transfer body is illustrated in a cross section perpendicular to the axial direction of the drum. The structure of this apparatus includes a roller-based applicator 14, an ink jet device 15, an air blower 16, a heater 17, a pressure roller 19, and a cleaning unit 20 arranged in this order around the drum-shaped intermediate transfer body in the direction of the rotation of the intermediate transfer body.

A transfer ink jet recording method in which this apparatus is used includes applying ink with the ink jet device selectively to the intermediate transfer body, to which a reaction solution has been applied, to form an intermediate image (intermediate-image formation); and transferring the intermediate image to a recording medium by pressing the intermediate transfer body on which the intermediate image has been formed against the recording medium (image transfer).

The intermediate transfer body in the apparatus illustrated in the FIGURE has a rotatable drum-shaped supporting member 12 and a surface member 11 on the outer surface of the supporting member 12. The supporting member 12 is driven to rotate around an axis 13 in the direction of the arrow, and the surrounding devices operate synchronously with the rotation of the supporting member 12.

The supporting member 12 of the intermediate transfer body in this structure is a cylindrical drum made of an aluminum alloy because of the rigidity that allows the intermediate transfer body to withstand the pressure applied during image transfer, dimensional accuracy, and characteristics needed for purposes such as reduced rotational inertia and improved responsiveness to control. The surface member 11 is made of a material that contains a compound that has a polyalkylsiloxane structure.

The roller-based applicator 14 is provided as a device that applies a reaction solution. In this structure, therefore, the reaction solution is continuously applied to the surface of the intermediate transfer body.

The ink jet device 15 is an ink jet head of the line-head type that discharges the ink on demand with the use of an electrothermal transducing element and has ink jet openings arranged in a line roughly parallel to the axis 13 of the intermediate transfer drum.

The air blower 16 is provided for the purpose of reducing the liquid content of the ink that makes up the intermediate image on the intermediate transfer body. A heater 17 is also provided that heats the intermediate transfer body from the back side. These components allow liquids in the intermediate image to dry out, thereby reducing the problems with the appearance of the finished image that occur during image transfer.

The pressure roller 19 is provided for the purpose of bringing the recording medium 18 into contact with the intermediate image on the intermediate transfer body so that the image should be transferred. Pressing the intermediate image and the recording medium 18 with the supporting member 12 and the pressure roller 19, with the image and the medium sandwiched, efficiently transfers the image. Although the shape of the recording medium used in this embodiment is a rolled long sheet, the recording medium may be multiple sheets cut into a specified shape.

A cleaning unit 20 is provided so that the intermediate transfer body after transferring the intermediate image to the recording medium 18 can be repeatedly used to form next images. The apparatus illustrated in the FIGURE has a structure in which a molleton-covered roller that stays wet with ion-exchanged water is intermittently abutted onto the surface of the intermediate transfer body.

A way of recording an image with the apparatus illustrated in the FIGURE is as follows. The intermediate transfer body is rotated around the axis 13 in the FIGURE in the direction of the arrow, and the roller-based applicator 14 applies a reaction solution to the surface of the surface member 11. The intended intermediate image (a mirror image of the finished image) is formed at the time when the surface of the surface member 11, to which the reaction solution has been applied, has reached the area where the ink jet device 15, i.e., an ink jet head, discharges the ink. The reaction solution that has been applied to the surface of the surface member 11 beforehand enhances, as a result of the action of the viscosity increasing component existing in the reaction solution, the viscosity of the ink that comes into contact therewith. This apparatus therefore allows the user to form a favorable image even on a recording medium that absorbs almost no ink, such as polyethylene terephthalate (PET) film.

As the intermediate transfer body rotates, the area of the surface member 11 on which the intermediate image has been formed moves to the region where the air blower 16 is disposed. Then a drying treatment is performed in which the air blower 16 blows air to reduce the volatile liquid content of the ink that makes up the intermediate image. The heater 17 heats the intermediate image from the back side of the intermediate transfer body, making this drying treatment more efficient. These components allow liquids in the ink image to dry out, thereby reducing the problems with the appearance of the finished image that occur during image transfer.

Then at the time when the intermediate image formed on the intermediate transfer body has reached the point where the pressure roller 19 is disposed, the intermediate image and the recording medium 18 are pressed with the supporting member 12 and the pressure roller 19, with the image and the medium sandwiched, which efficiently transfers the image.

Then the cleaning unit 20 cleans the surface of the surface member 11 so that the intermediate transfer body after transferring the intermediate image to the recording medium 18 can be repeatedly used to form next images.

EXAMPLES

The following describes an aspect of the invention in more detail by providing examples and comparative examples. No aspect of the invention is limited to these examples while within the scope of the invention. The terms "parts" and "%" in the following text are based on mass unless otherwise specified. The recorded images were assessed with the use of an apparatus that had the structure illustrated in the FIGURE.

Examples 1 to 13 and Comparative Examples 1 to 5

Preparation of Black Pigment Dispersion 1

The materials listed below were mixed, and the resulting mixture was loaded into a batch vertical sand mill (AIMEX Co., Ltd.). The mixture was then dispersed for 5 hours with 200 parts 0.3-mm zirconia beads while being cooled with water, yielding a dispersion.

Grouping of Solvents into Good Solvents and Poor Solvents

Two grams each of polyether-modified siloxane compounds were added dropwise to 6 g each of the water-soluble organic solvents listed in Table 1. The solubility on the next day was determined in accordance with the evaluation criteria below. The results are summarized in Table 1. Haze values measured by a measuring method compliant with JIS K7136 with the use of NDH2000 transmittance/haze meter (Nippon Denshoku Industries) were used as a measure of turbidity.

A: The turbidity (haze value) was less than 5%. The solvent was found to be a good solvent.

B: The turbidity (haze value) was equal to or more than 5%. The solvent was found to be a poor solvent.

TABLE 1

| | Water-soluble organic solvents | | | | | |
|---|---|---|---|---|---|---|
| Surfactants | Hexylene glycol | Glycerin | Diethylene glycol | Ethanol | Hexanediol | 1,5-Pentanediol |
| Side-chain polyether-modified siloxane BYK349 (BYK Japan KK) | A | B | B | A | A | B |
| Side-chain polyether-modified siloxane BYK348 (BYK Japan KK) | A | B | B | A | A | B |
| Terminal polyether-modified siloxane BYK333 (BYK Japan KK) | A | B | A | A | A | B |

Pigment [carbon black (product name, Monarch 1100; Cabot), 10 parts

Polymer solution P1 (an aqueous solution of a styrene-ethyl acrylate-acrylic acid copolymer with an acid value of 150, a weight-average molecular weight of 8,000, and a glass transition temperature of 95° C.; 20% solids; neutralizing agent, potassium hydroxide), 15 parts Purified water, 75 parts The resulting dispersion was processed in a centrifuge so that coarse particles should be removed. Thus a black pigment dispersion 1 was obtained with a pigment concentration of approximately 10%.

Preparation of Black Pigment Dispersion 2

A self-dispersion carbon black dispersion (trade name, CAB-O-JET 200; Cabot) was prepared.

Production of a Polymer-Particle Dispersant

A mixture of 18 parts of ethyl methacrylate, 2 parts of 2,2'-azobis-(2-methylbutyronitrile), and 2 parts of n-hexadecane was agitated for 0.5 hours. Then the mixture was added dropwise to 78 parts of a 6% aqueous solution of NIKKOL BC15 (Nikko Chemicals), an emulsifier, and the resulting liquid was agitated for 0.5 hours. The liquid was then sonicated with an ultrasonic device for 3 hours. After a 4-hour polymerization reaction in a nitrogen atmosphere at 80° C., the liquid was allowed to cool to room temperature and then filtered, yielding a polymer-particle dispersion with a concentration of approximately 20%. The mass-average molecular weight and the particle diameter of the resulting polymer particles were approximately 210,000 and approximately 220 nm, respectively.

Preparation of Inks

Inks were prepared with the compositions specified in Tables 2 and 3. More specifically, the inks were prepared by the following method: for each of the compositions in Tables 2 and 3, the materials needed were mixed, the resultant mixture was thoroughly agitated, and then the mixture was pressure-filtered through a 3.0-µm microfilter (Fujifilm). In Tables 2 and 3, the values have a unit of "%" and the "Balance" represents the mass of water added to make the total content of the ink 100%.

Intermediate Transfer Body

The surface section of the intermediate transfer body was a 0.5-mm thick polyethylene terephthalate (PET) sheet with a 0.2-mm thick coating of a silicone rubber that had a rubber hardness of 40° (Shin-Etsu Chemical; trade name, KE12). This rubber-coated sheet was fastened with double-sided tape to a supporting member, or more specifically a cylindrical drum made of an aluminum alloy, to make an intermediate transfer body.

Reaction Solution

A reaction solution was prepared by mixing the materials in the composition below, thoroughly agitating the resulting mixture, and then pressure-filtering the mixture through a 3.0-µm microfilter (Fujifilm).

Levulinic acid, 80.0 parts
Glycerin, 10.0 parts
A surfactant (Acetylenol E100), 0.5 parts
Ion-exchanged water, balance Evaluation of Images on Recorded Articles A solid image with a 100% duty was formed on the transfer body with the use of an apparatus that had the structure illustrated in the FIGURE, and the image printed on the recording paper through image transfer was observed under a microscope. With the ink jet recording apparatus, an image recorded under the conditions under which approximately 3.0 ng of one ink droplet was applied to a unit area (one pixel) of $1/1200$ inches*$1/1200$ inches at a resolution of 1200 dpi*1200 dpi was assumed to have an ink print duty of 100%. In this case, the transfer body can be fully covered with the ink (a solid image can be formed) with substantially no white background area derived from the transfer body and a sufficient increase in dot diameter if each single dot has a spread of approximately 21 μm or more.

The image was recorded on Pearl Coat, manufactured by Mitsubishi Paper Mills, as recording medium with a drier and a heater provided between image formation and image transfer. The heating temperature was 80° C. The intermediate image was transported on the rotating drum-shaped intermediate transfer body at a speed of 100 mm/sec. The images on the recorded articles obtained in Examples and Comparative Examples were evaluated in accordance with the criteria below. The results are summarized in Tables 2 and 3.

AA: No white background area attributable to the intermediate transfer body was observed in a 5 cm×5 cm solid image.

A: A white background area attributable to the intermediate transfer body was observed in 5% or less of the area of a 5 cm×5 cm solid image.

C: A white background area attributable to the intermediate transfer body was observed in more than 5% of the area of a 5 cm×5 cm solid image.

The composition of each ink and the evaluation of the image obtained with the use of the ink are summarized in Tables 2 and 3.

An aspect of the invention provides a transfer image recording method by which a high-quality image can be obtained even with a small volume of ink applied. Another aspect of the invention provides an ink used in this method.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-095619, filed Apr. 30, 2013, which is hereby incorporated by reference herein in its entirety.

TABLE 2

|  | Example 1 | Example 2 | Example 3 | Example 4 | Example 5 | Example 6 | Example 7 | Example 8 | Example 9 | Example 10 | Example 11 | Example 12 | Example 13 |
|---|---|---|---|---|---|---|---|---|---|---|---|---|---|
| Black pigment dispersion 1 | 2 | 2 | 2 | 2 | 2 | 2 | 2 | 2 | 0 | 0 | 2 | 2 | 2 |
| Black pigment dispersion 2 | 0 | 0 | 0 | 0 | 0 | 0 | 0 | 0 | 2 | 2 | 0 | 0 | 0 |
| Polymer-particle dispersion | 0 | 0 | 0 | 0 | 0 | 0 | 0 | 6 | 0 | 6 | 0 | 0 | 0 |
| Hexylene glycol | 8 | 8 | 8 | 8 | 8 | 6 | 4 | 8 | 8 | 8 | 2 | 6 | 6 |
| Glycerin | 4 | 4 | 4 | 4 | 4 | 6 | 8 | 4 | 4 | 4 | 10 | 10 | 10 |
| Diethylene glycol | 0 | 0 | 0 | 0 | 0 | 0 | 0 | 0 | 0 | 0 | 0 | 0 | 0 |
| BYK349 | 3 | 5 | 7 | 9 | 15 | 5 | 5 | 5 | 5 | 5 | 9 | 0 | 0 |
| BYK348 | 0 | 0 | 0 | 0 | 0 | 0 | 0 | 0 | 0 | 0 | 0 | 9 | 0 |
| BYK333 | 0 | 0 | 0 | 0 | 0 | 0 | 0 | 0 | 0 | 0 | 0 | 0 | 9 |
| Water | Balance | Balance | Balance | Balance | Balance | Balance | Balance | Balance | Balance | Balance | Balance | Balance | Balance |
| Image evaluation result | A | A | A | AA | AA | A | A | A | A | A | A | AA | A |

TABLE 3

|  | Comparative Example 1 | Comparative Example 2 | Comparative Example 3 | Comparative Example 4 | Comparative Example 5 |
|---|---|---|---|---|---|
| Black pigment dispersion 1 | 2 | 2 | 2 | 2 | 2 |
| Black pigment dispersion 2 | 0 | 0 | 0 | 0 | 0 |
| Polymer-particle dispersion | 0 | 0 | 0 | 0 | 0 |
| Hexylene glycol | 12 | 0 | 0 | 8 | 8 |
| Glycerin | 0 | 12 | 0 | 4 | 4 |
| Diethylene glycol | 0 | 0 | 12 | 0 | 0 |
| BYK349 | 5 | 5 | 5 | 0.3 | 2 |
| Water | Balance | Balance | Balance | Balance | Balance |
| Image evaluation result | C | C | C | C | C |

What is claimed is:

1. An image recording method comprising:

applying ink to an intermediate transfer body to form an intermediate image; and transferring the intermediate image to a recording medium, the intermediate transfer body having a polyalkylsiloxane structure on a surface on which the intermediate image is to be formed, the ink containing a pigment, water, a water-soluble organic solvent, and a polyether-modified siloxane compound, the water-soluble organic solvent containing a good solvent for the polyether-modified siloxane compound and a poor solvent for the polyether-modified siloxane compound, a content of the polyether-modified siloxane compound in the ink being 3% by mass or more and 20% by mass or less based on a total mass of the ink, a content of the water-soluble organic solvent being 10% by mass or more and 60% by mass or less based on the total mass of the ink, wherein the good solvent is a solvent that mixes with the polyether-modified siloxane compound at a mixing ratio by mass of the good solvent to the polyether-modified siloxane of 1:3 to produce a mixture having a turbidity of less than 5%, wherein the poor solvent is a solvent that mixes with the polyether-modified siloxane compound at a mixing ratio by mass of the poor solvent to the polyether-modified siloxane of 1:3 to produce a mixture having a turbidity of 5% or more, and wherein a mass ratio of a content of the poor solvent based on the total mass of the ink to a content of the good solvent based on the total mass of the ink is 0.25 times or more and 19 times or less.

2. The image recording method according to claim 1, wherein the content of the polyether-modified siloxane compound in the ink is 9% by mass or more and 20% by mass or less based on the total mass of the ink.

3. The image recording method according to claim 1, wherein the polyether-modified siloxane compound is a compound of general formula (1):

(1)

where $R^1$ to $R^4$ and $R^6$ to $R^{11}$ independently represent hydrogen or a monovalent organic group, $R^5$ represents a divalent organic group, x, y, and "a" independently represent an integer of at least 1, and z and b independently represent an integer of at least 0.

4. The image recording method according to claim 1, wherein the good solvent is selected from the group consisting of hexylene glycol, ethanol, and hexanediol, and wherein the poor solvent is glycerin or 1,5 pentanediol.

5. An ink for an image recording method including applying ink to an intermediate transfer body to form an intermediate image, the intermediate transfer body having a polyalkylsiloxane on a surface on which the intermediate image is to be formed, and transferring the intermediate image to a recording medium, the ink comprising:

a pigment; water; a water-soluble organic solvent; and a polyether-modified siloxane compound, the water-soluble organic solvent containing a good solvent for the polyether-modified siloxane compound and a poor solvent for the polyether-modified siloxane compound, a content of the polyether-modified siloxane compound in the ink being 3% by mass or more and 20% by mass or less based on a total mass of the ink, a content of the water-soluble organic solvent being 10% by mass or more and 60% by mass or less based on the total mass of the ink, wherein the good solvent is a solvent that mixes with the polyether-modified siloxane compound at a mixing ratio by mass of the good solvent to the polyether-modified siloxane of 1:3 to produce a mixture having a turbidity of less than 5%, wherein the poor solvent is a solvent that mixes with the polyether-modified siloxane compound at a mixing ratio by mass of the poor solvent to the polyether-modified siloxane of 1:3 to produce a mixture having a turbidity of 5% or more, and wherein a mass ratio of a content of the poor solvent based on the total mass of the ink to a content of the good solvent based on the total mass of the ink is 0.25 times or more and 19 times or less.

6. The ink for the image recording method according to claim 5, wherein the content of the polyether-modified siloxane compound in the ink is 9% by mass or more and 20% by mass or less based on the total mass of the ink.

* * * * *